US012617999B2

(12) United States Patent
Doan et al.

(10) Patent No.: US 12,617,999 B2
(45) Date of Patent: May 5, 2026

(54) SELF-HEALING CEMENT

(71) Applicant: Baker Hughes Oilfield Operations LLC, Houston, TX (US)

(72) Inventors: Angela Anh Doan, Spring, TX (US); Radhika Suresh, Sugar Land, TX (US)

( * ) Notice: Subject to any disclaimer, the term of this patent is extended or adjusted under 35 U.S.C. 154(b) by 0 days.

(21) Appl. No.: 18/816,625

(22) Filed: Aug. 27, 2024

(65) Prior Publication Data

US 2026/0062602 A1 Mar. 5, 2026

(51) Int. Cl.
| | |
|---|---|
| *C09K 8/467* | (2006.01) |
| *C04B 16/02* | (2006.01) |
| *C04B 16/04* | (2006.01) |
| *C04B 20/00* | (2006.01) |
| C04B 103/40 | (2006.01) |

(52) U.S. Cl.
CPC .............. *C09K 8/467* (2013.01); *C04B 16/02* (2013.01); *C04B 16/04* (2013.01); *C04B 20/008* (2013.01); C04B 2103/408 (2013.01); C09K 2208/10 (2013.01)

(58) Field of Classification Search
CPC ...................................................... E21B 33/13
See application file for complete search history.

(56) References Cited

U.S. PATENT DOCUMENTS

| | | | |
|---|---|---|---|
| 11,466,187 | B2 | 10/2022 | Lipscomb et al. |
| 2014/0090843 | A1 | 4/2014 | Boul et al. |
| 2017/0145285 | A1* | 5/2017 | Lafitte .................... C09K 8/035 |
| 2018/0148630 | A1 | 5/2018 | Yakovlev et al. |
| 2020/0339862 | A1 | 10/2020 | Sodhi |
| 2022/0048819 | A1* | 2/2022 | Shanmugam ......... C04B 14/062 |
| 2022/0363973 | A1* | 11/2022 | Heidlas ................... E21B 33/14 |

FOREIGN PATENT DOCUMENTS

| | | |
|---|---|---|
| CN | 114105542 A | 3/2022 |

OTHER PUBLICATIONS

Telmadarreie, A. et al., "Cellulose Nanocrystal Switchable Gel for Improving CO2 Sweep Efficiency in Enhanced Oil Recovery and Gas Storage", Society of Petroleum Engineers, SPE-201609-MS, Oct. 2020, 9 pages.
International Search Report and Written Opinion; PCT/US2025/037855; European Patent Office; Mailed Nov. 6, 2025; 11 pages.

* cited by examiner

*Primary Examiner* — William D Hutton, Jr.
*Assistant Examiner* — Avi T Skaist
(74) *Attorney, Agent, or Firm* — Baker Hughes Company

(57) ABSTRACT

A method of cementing a wellbore includes forming a cement slurry by combining a nanocellulose, an amine component, a cement component, and an aqueous carrier; injecting the cement slurry into the wellbore; and allowing the cement slurry to set, thereby cementing the wellbore.

11 Claims, 1 Drawing Sheet

SELF-HEALING CEMENT

BACKGROUND

Plugging oil or gas wells with a cement plug is a common operation in the art. In general, one of the goals of plug cementing is to secure a stable and effective seal in a designated location of the wellbore. In other cases, a cement plug may be used to provide a base for initiating a derivation or kick-off when a directional change in drilling is desired. A cement operation can also be used for temporary or permanent well abandonment.

Cement plugs are often constructed by pumping a cement slurry down a tubular such as a drill pipe, liner or casing. Once placed at the target location, the cement slurry sets and hardens by reaction with water, forming a cement plug.

Set cement, however, is susceptible to degradation when exposed to carbon dioxide at elevated temperatures and pressures for an extended period of time. The degradation can lead to cracks or fractures which can compromise the integrity of the cement. Accordingly, there remains a need in the art for self-healing cements.

SUMMARY

A method of cementing a wellbore includes forming a cement slurry by combining a nanocellulose, an amine component, a cement component, and an aqueous carrier; injecting the cement slurry into the wellbore; and allowing the cement slurry to set, thereby cementing the wellbore.

A cement slurry includes, a cement component; about 0.05 to about 10 weight percent of a nanocellulose; about 0.05 to about 10 weight percent of an amine component; and about 10 to about 120 weight percent of an aqueous carrier, each based on a weight of the cement component.

DETAILED DESCRIPTION

Figure 1A:
FIG. 1A and FIG. 1B are pictures of cements derived from cement slurries without (FIG. 1A) or with (FIG. 1B) cellulose nanocrystals (CNC) after curing in water bath at 100° F. for 24 hours, and placed in CO2 chamber cells at 100° F. for 24 hours.
Figure 1A:

A cement slurry that can form a cement having self-healing properties is disclosed. The cement slurry comprises a nanocellulose, an amine component, a cement component, and an aqueous carrier. Once injected downhole, the cement slurry can set forming a cement. When there's a fracture on the cement, and $CO_2$ gas is coming out of the wellbore, $CO_2$ can react with the amine in the cement forming a gel, which seals the fracture on the cement.

Nanocellulose is a term referring to nano-structured cellulose. Nanocellulose can include cellulose nanofibers, bacterial nanocelluloses, or cellulose nanocrystals. Cellulose nanofibers can include nanosized cellulose fibrils. Bacterial nanocellulose refers to nano-structured cellulose produced by bacteria.

Cellulose nanocrystals are known and have been described, for example, in U.S. Pat. No. 11,466,187. Cellulose nanocrystals can be extracted as a colloidal suspension by acid hydrolysis of chemical wood pulps, and other cellulosic materials, such as bacteria, cellulose-containing sea animals, cotton, and the alike. Cellulose nanocrystals are constituted of cellulose, a linear polymer of beta (1 to 4) linked D-glucose units.

Cellulose nanocrystals can also have high crystallinity (e.g., at least 60%, 70%, 80%, 85%, or even 90%) approaching the theoretical limit of the cellulose chains, where crystallinity refers to the crystalline fraction of the sample.

The physical dimensions of cellulose nanocrystals can vary depending on the raw material used in the extraction. For example, the average maximum dimension of a cross-section of the cellulose nanocrystal cellulose nanocrystal (perpendicular to the length) can be about 2 nanometers (nm) to about 50 nm, about 4 nm to about 50 nm, about 4 nm to about 30 nm, about 1 nm to about 20 am, or about 1 to about 10 nm. The average length (maximum dimension) of the cellulose nanocrystal can be about 50 nm to about 2 micrometer (μm), about 75 nm to about 750 nm, about 100 nm to about 500 nm, about 75 nm to about 250 nm, about 50 nm to about 200 nm, or about 50 nm to about 100 nm. The cellulose nanocrystals can have a high aspect ratio (ratio of height versus length), for example, about 10 to about 100. The cellulose nanocrystals can exist as agglomerate prior to being dispersed in the cement slurry.

Optionally, the surfaces of the cellulose nanocrystals can have a plurality of functional groups, including hydroxyl, carboxyl, amino, and/or sulfate half-ester groups.

Cellulose nanocrystals can also be functionalized or crosslinked with other polymers or ionic materials, including alkaline-earth cations, or transition-d-block metal cations such as titanium, vanadium, chromium, manganese, iron, cobalt, nickel, or copper cations.

A content of the nanocellulose in the cement slurry can be about 0.05 to about 10 weight percent, about 0.5 to about 5 weight percent, about 0.5 to about 1 weight percent, or about 1 to about 5 weight percent, based on a total weight of the cement component.

The amine component can comprise at least one of an amine compound (including polymers) or amine-functionalized nanoparticles. The amine compound can be a mono-amine; a diamine such as a primary/primary diamine, a primary/secondary diamine, a primary/tertiary diamine, and a secondary/secondary diamine; a polyamine such as a triamine, a tetramine, and an aminopolymer such as poly-ethyleneimine. Preferably, the amine comprises at least a diamine, a polyamine, or an aminopolymer such as poly-ethyleneimine.

The amine-functionalized nanoparticles can be amine-functionalized inorganic nanoparticles such as amine-functionalized metal nanoparticles, amine-functionalized metal or metalloid oxide nanoparticles, amine-functionalized metal or metalloid hydroxide nanoparticles, amine-functionalized metal or metalloid carbide nanoparticles, amine-functionalized metal or metalloid nitride nanoparticles or a combination comprising at least one of the foregoing. The amine in the amine-functionalized nanoparticles can include a monoamine, a diamine, or a polyamine such as a triamine, a tetramine, or an aminopolymer such as polyethyleneimine.

As used herein, "amine-functionalized nanoparticles" include both non-covalently functionalized nanoparticles and covalently functionalized nanoparticles. Non-covalent functionalization is based on van der Walls forces, hydrogen bonding, ionic interactions, dipole-dipole interactions, hydrophobic or π-π interactions. Covalent functionalization means that the amine is covalently bonded to the nanoparticles, either directly or via an organic moiety. Any known methods to functionalize the nanoparticles can be used.

Examples of the amine-functionalized nanoparticles include amine-functionalized silica, amine-functionalized alumina, amine-functionalized titania, amine-functionalized silicic acid, amine-functionalized aluminum oxides, amine-functionalized aluminum hydroxides, amine-functionalized aluminum hydroxyoxides, amine-functionalized alumino-silicates, amine-functionalized zirconium oxides, amine-functionalized zirconium hydroxides, amine-functionalized zirconium hydroxyoxides, amine-functionalized tungsten oxide, amine-functionalized iron oxide, amine-functionalized tungsten carbide, amine-functionalized silicon carbide, amine-functionalized boron carbide, amine-functionalized titanium nitride, amine-functionalized titanium boron nitride, amine-functionalized titanium silicon nitride or a combination comprising at least one of the foregoing. The amine-functionalized nanoparticles can also include amine-functionalized metal nanoparticles such as amine-function-alized alkali metals, amine-functionalized alkaline earth metals, amine-functionalized inner transition metals (a lanthanide or actinide), amine-functionalized transition metals or post-transition metals. Examples of such metals that can be functionalized with amine include magnesium, aluminum, iron, tin, titanium, platinum, palladium, cobalt, nickel, vanadium, chromium, manganese, zirconium, ruthenium, hafnium, tantalum, tungsten, rhenium, osmium, alloys thereof as well as barium or strontium titanate or a combination thereof. Preferred amine-functionalized nanoparticles include amine-functionalized alumina nanoparticles, amine-functionalized boehmite nanoparticles, and amine-function-alized zirconia nanoparticles.

A content of the amine component in the cement slurry can be about 0.05 to about 10 weight percent, about 0.5 to about 5 weight percent, about 0.5 to about 1 weight percent, or about 1 to about 5 weight percent, based on a total weight of the cement component.

The cement component of the cement slurry can be any cementitious material that sets and hardens by reaction with water, and is suitable for forming a set cement downhole, including mortars and concretes. Suitable cement components include those typically employed in a wellbore environment, for example those comprising calcium, aluminum, silicon, oxygen, and/or sulfur. Such cements include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V. The cements herein also can include various concretes by the further addition of aggregates, such as a coarse aggregate made of gravel or crushed rocks such as chert, quartzite, granite, and/or a fine aggregate such as sand or crushed sand. Aggregate can be added in an amount of about 10% to about 70% by weight of the hydraulic cement, and more particularly about 20% to about 40% by weight. Glass G cement is preferred.

The aqueous carrier fluid can be fresh water, brine (including seawater), an aqueous base, or a combination comprising at least one of the foregoing. The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine.

The aqueous carrier can be present in the cement slurry in an amount of about 10 to about 120 weight percent, or about 30 to about 70 weight percent, based on the total weight of the cement component.

The cement slurry can further comprise other components (additives) known for use in cementing, for example a setting accelerator to reduce setting time, a setting retardant to extend setting time, a fluid loss control agent, an extender to lower density, a gelling agent to increase viscosity, a defoamer to reduce foaming, a weighting agent to increase density, a dispersant to reduce viscosity, other fluid loss control agents, thixotropic agents, a bridging agent or lost circulation material (e.g., gilsonite or cellophane flakes), silicate materials such as sand, silica flour, fumed silica, act to strengthen cement as well as protect from strength retrogression effects at temperatures above 230° F., clay stabilizers, or a combination comprising at least one of the foregoing. These additive components are selected to avoid imparting unfavorable characteristics to the cement slurries, and to avoid damaging the wellbore or subterranean formation. Each additive can be present in amounts generally known to those of skill in the art.

Setting accelerators can include compounds such as tri-ethanolamines, calcium chloride, potassium chloride, sodium chloride, sodium formate, sodium nitrate, and other alkali and alkaline earth metal halides, formates, nitrates, and sulfates.

Setting retardants can include compounds such as such as hydroxycarboxylic acids and their salts, such as sodium tartrate, sodium citrate, sodium gluconate, sodium itaconate, tartaric acid, citric acid, and gluconic acid, lignosulfonates, saccharides, polysaccharides, organophosphates such as $C_{2-12}$ alkylene phosphonic acids, salts such as sodium chloride, and oxides of zinc and lead, and the like.

Gelling agents can include compounds such as guar, welan, xanthan, diutan, dextran gum, starch, starch derivatives, polysaccharides, cellulose, cellulosic derivatives, hydroxyalkyl cellulose, carboxyalkyl celluloses, carboxyalkyl hydroxyalkyl celluloses, dialkyl carboxyalkyl celluloses and mixtures thereof.

Extenders can include low density aggregates, clays such as hydrous aluminum silicates (e.g., bentonite (85% mineral clay smectite), pozzolan (finely ground pumice of fly ash), diatomaceous earth, silica, e.g., α quartz and condensed silica fumed silica, expanded Pearlite, gilsonite, powdered coal, and the like.

Defoamers can include polysiloxanes, paraffinic oils, mineral oils, vegetable oils as well as the mixtures.

Weighting agents are high-specific gravity and finely divided solid materials used to increase density. Weighting agents can include silica flour, fly ash, calcium carbonate, barite, hematite, ilmenite, siderite, and the like.

Examples of suitable dispersants include naphthalene sulfonate formaldehyde condensates, acetone formaldehyde sulfite condensates, and glucan delta lactone derivatives.

Other dispersants can also be used depending on the application of interest. If present, the content of the dispersant in the cement slurry can be about 0.01 to about 2 weight percent, preferably about 0.2 to about 2 weight percent, more preferably about 0.1 or 0.2 to about 1.5 weight percent, based on a total weight of the cement component.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl, which also act at low concentrations to generally accelerate the set time associated with a cement slurry.

The cement slurry can include, the cement component; about 0.05 to about 10 weight percent, about 0.5 to about 5 weight percent, about 0.5 to about 1 weight percent, or about 1 to about 5 weight percent of the nanocellulose; about 0.05 to about 10 weight percent, about 0.5 to about 5 weight percent, about 0.5 to about 1 weight percent, or about 1 to about 5 weight percent of the amine component; about 10 to about 120 weight percent or about 30 to about 70 weight percent of the aqueous carrier, and optionally about 0.01 to about 2 weight percent, about 0.2 to about 2 weight percent, or about 0.1 or 0.2 to about 1.5 weight percent, of the dispersant, each based on a weight of the cement component.

The cement slurry can have a viscosity lower than 600 mPa-s at a shear rate of $100 \ s^{-1}$ at 23° C. The cement slurry can be a low-density cement slurry or a high-density cement slurry. The density of a low-density cement slurry can vary with such densities between about 9 up to about 15 pounds per gallon, or about 10 to about 14 pounds per gallons, or about 11 up to about 13 pounds per gallon. The high-density cement slurries can have a density of about 15 to about 25 pounds per gallon. As an example, the cement slurry has a density of about 10 to about 20 pounds per gallon or about 12 to about 18 pounds per gallon.

The cement slurry can be prepared by combining the nanocellulose, the amine component, the cement component, the aqueous carrier, and the optional additive comprising at least one of a dispersant, a setting accelerator, a setting retardant, a gelling agent, a fluid loss control agent, an extender, a defoamer, a weighting agent, a thixotropic agent, a bridging agent or lost circulation material, a silicate material, or a clay stabilizer. Preferably, the nanocellulose is combined with the amine component first to form a gel, then the gel is mixed with the cement component, the aqueous carrier, and the optional additive to form the cement slurry.

The cement slurry can then be injected, e.g., pumped and placed by various cement pumps and tools to any desired location within the wellbore to fill any desired shape form. Injecting the cement slurry can include pumping the slurry via a tubular in the wellbore. For example, the slurry can be pumped into an annulus between a tubular and a wall of the wellbore via the tubular. In addition, the cement slurry can be injected or pumped at a pressure sufficient to displace a drilling fluid, for example a drilling mud, a cement spacer, or the like, optionally with a "lead slurry" or a "tail slurry". Once placed, the cement slurry is allowed to harden.

The cement slurry can be used to form downhole components, including various casings, seals, plugs, packings, liners, and the like. In an embodiment the component is a plug, including a temporary plug, permanent plug, or a whipstock plug. The whipstock plug can be used to kick off from a vertical wellbore when a directional change in drilling is desired. The settable slurry can be used in vertical, horizontal, or deviated wellbores.

During the lifetime of the downhole components formed from the cement slurry, cracks can form. When there's a facture on cement and $CO_2$ gas is coming, $CO_2$ can react with the amine, forming a gel, which can seal the fracture on cement.

The beneficial effects of using the nanocellulose and the amine in cement slurries are further illustrated in the following examples.

EXAMPLE

The baseline cement slurry was prepared by mixing Class G cement and 0.6% bwoc of cement dispersant additive with tap water at the density of 15.8 ppg. As used herein, "bwoc" means based on the weight of the cement component.

The cement slurry with the CNC was prepared by mixing Class G cement, 0.6% bwoc of cement dispersant additive, 0.5% bwoc of CNC with tap water and then added 0.5% bwoc of amine at the density of 15.8 ppg.

Figure 1B:
Figure 2A:
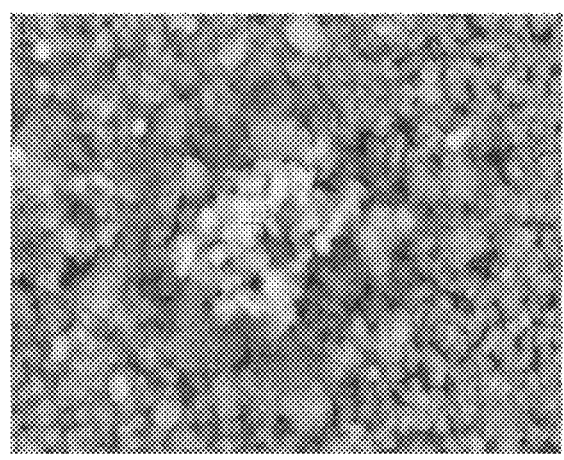
FIG. 2A and FIG. 2B are scanning electron microscope (SEM) images of cements derived from cement slurries without (FIG. 1A) or with (FIG. 1B) CNC after curing in water bath at 100° F. for 24 hours, and placed in $CO_2$ chamber cells at 100° F. for 24 hours.
Figure 2B:
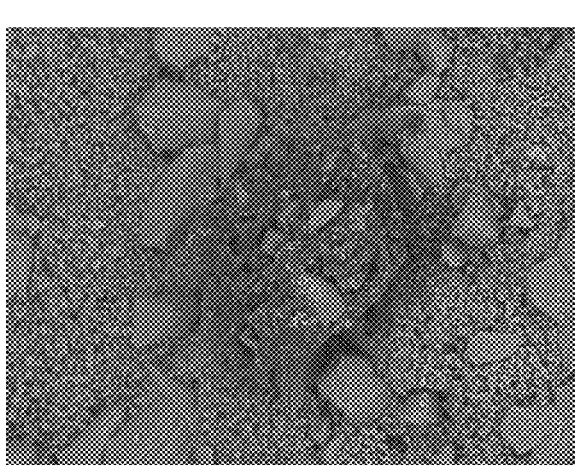

Both cement slurries were cured in water bath at 100° F. for 24 hours. Then the samples were placed in $CO_2$ chamber cells at 100° F. for 24 hours. The pictures and SEM images of the samples are shown in FIGS. 1A, 1B, 2A and 2B.

Overall, there were some differences between the inorganic precipitates forming on the surface of each sample, both in shape and iron content. The baseline appears to have a of carbonate material crust ($CaCO_3$). This could be due to the solid solution of $CaCO_3$, discrete crystal of each, or ankerite. The sample with CNC mainly features calcite crystals growing off the surface with some nitrogen-containing clusters evident in FIG. 2B, indicating the presence of amine.

Further included in this disclosure are the following specific methods and cement slurries, which do not necessarily limit the claims.

Embodiment 1

A method of cementing a wellbore, the method comprising: forming a cement slurry by combining a nanocellulose, an amine component, a cement component, and an aqueous carrier; injecting the cement slurry into the wellbore; and allowing the cement slurry to set, thereby cementing the wellbore.

Embodiment 2

The method as in any prior embodiment, wherein forming the cement slurry comprises combining the nanocellulose with the amine component to form a gel, and mixing the gel with the cement component and the aqueous carrier to form the cement slurry.

Embodiment 3

The method as in any prior embodiment, wherein the nanocellulose comprises a cellulose nanocrystal, a cellulose nanofiber, or a bacterial nanocellulose.

7

Embodiment 4

The method as in any prior embodiment, wherein a content of the nanocellulose is about 0.05 to about 10 weight percent based on a weight of the cement component.

Embodiment 5

The method as in any prior embodiment, wherein the amine component comprises at least a diamine, a polyamine, or an aminopolymer.

Embodiment 6

The method as in any prior embodiment, wherein the amine component comprises a polyethyleneimine.

Embodiment 7

The method as in any prior embodiment, wherein the amine component comprises amine-functionalized inorganic nanoparticles.

Embodiment 8

The method as in any prior embodiment, wherein a content of the amine component in the cement slurry is about 0.05 to about 5 weight percent based on a weight of the cement component.

Embodiment 9

The method as in any prior embodiment, wherein forming the cement slurry comprising combining the cellulose nanocrystal, the amine component, the cement component, the aqueous carrier, and an additive.

Embodiment 10

The method as in any prior embodiment, wherein the additive comprises at least one of a dispersant, a setting accelerator, a setting retardant, a gelling agent, a fluid loss control agent, an extender, a defoamer, a weighting agent, a thixotropic agent, a bridging agent or lost circulation material, a silicate material, or a clay stabilizer.

Embodiment 11

The method as in any prior embodiment, wherein the additive comprises a dispersant.

Embodiment 12

The method as in any prior embodiment, wherein the dispersant comprises at least one of a naphthalene sulfonate formaldehyde condensate, an acetone formaldehyde sulfite condensate, or a glucan delta lactone derivative.

Embodiment 13

The method as in any prior embodiment, wherein a content of the dispersant in the cement slurry is about 0.05 to about 5 weight percent based on a weight of the cement component.

Embodiment 14

The method as in any prior embodiment, wherein the cement slurry comprises about 0.05 to about 10 weight percent of the cellulose nanocrystal, about 0.05 to about 10 weight percent of the amine component, about 0.01 to about 2 weight percent of a dispersant, and about 10 to about 120 weight percent of the aqueous carrier, each based on a weight of the cement component.

Embodiment 15

The method as in any prior embodiment, wherein the cement slurry has a density of about 7 to about 22 pounds per gallon.

Embodiment 16

A cement slurry comprising, a cement component; about 0.05 to about 10 weight percent of a nanocellulose; about 0.05 to about 10 weight percent of an amine component; and about 10 to about 120 weight percent of an aqueous carrier, each based on a weight of the cement component.

Embodiment 17

The cement slurry as in any prior embodiment, wherein the amine component comprises at least a diamine, a polyamine, or an aminopolymer, and the nanocellulose comprises a cellulose nanocrystal.

Embodiment 18

The cement slurry as in any prior embodiment, wherein the amine component comprises a polyethyleneimine.

Embodiment 19

The cement slurry as in any prior embodiment, wherein the amine component comprises amine-functionalized inorganic nanoparticles.

Embodiment 20

The cement slurry as in any prior embodiment, wherein the cement slurry further comprises an additive comprising at least one of a dispersant, a setting accelerator, a setting retardant, a gelling agent, a fluid loss control agent, an extender, a defoamer, a weighting agent, a thixotropic agent, a bridging agent or lost circulation material, a silicate material, or a clay stabilizer.

All ranges disclosed herein are inclusive of the endpoints, and the endpoints are independently combinable with each other (e.g., a range of "5 wt % to 20 wt %" is inclusive of the endpoints and all intermediate values of the ranges of "5 wt % to 25 wt %," etc.). "Combinations" is inclusive of blends, mixtures, alloys, reaction products, and the like. "Or" means "and/or" unless clearly stated otherwise. The use of the terms "a" and "an" and "the" and similar referents in the context of describing the invention (especially in the context of the following claims) are to be construed to cover both the singular and the plural, unless otherwise indicated herein or clearly contradicted by context. The term "about" is intended to include the degree of error associated with measurement of the particular quantity based upon the equipment available at the time of filing the application. For example, "about" can include a range of ±8% of a given value.

Unless defined otherwise, technical and scientific terms used herein have the same meaning as is commonly understood by one of skill in the art to which this invention belongs.

While typical methods/downhole assemblies have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of cementing a wellbore, the method comprising:

forming a cement slurry by:

combining a nanocellulose and an amine component comprising amine-functionalized inorganic nanoparticles to form a gel; and adding a cement component and an aqueous carrier to the gel;

injecting the cement slurry into the wellbore; and setting the cement slurry, thereby cementing the wellbore.

2. The method of claim 1, wherein the nanocellulose comprises a cellulose nanocrystal, a cellulose nanofiber, or a bacterial nanocellulose.

3. The method of claim 1, wherein a content of the nanocellulose is about 0.05 to about 10 weight percent based on a weight of the cement component, and the nanocellulose comprise a crystallinity greater than or equal to 85%.

4. The method of claim 1, wherein a content of the amine component in the cement slurry is about 0.05 to about 5 weight percent based on a weight of the cement component.

5. The method of claim 1, wherein forming the cement slurry further comprises adding the cement component, the aqueous carrier, and an additive to the gel.

6. The method of claim 5, wherein the additive comprises at least one of a dispersant, a setting accelerator, a setting retardant, a gelling agent, a fluid loss control agent, an extender, a defoamer, a weighting agent, a thixotropic agent, a bridging agent or lost circulation material, a silicate material, or a clay stabilizer.

7. The method of claim 5, wherein the additive comprises a dispersant.

8. The method of claim 7, wherein the dispersant comprises at least one of a naphthalene sulfonate formaldehyde condensate, an acetone formaldehyde sulfite condensate, or a glucan delta lactone derivative.

9. The method of claim 7, wherein a content of the dispersant in the cement slurry is about 0.05 to about 5 weight percent based on a weight of the cement component.

10. The method of claim 6, wherein the cement slurry comprises about 0.05 to about 10 weight percent of the cellulose nanocrystal, about 0.05 to about 10 weight percent of the amine component, about 0.01 to about 2 weight percent of a dispersant, and about 10 to about 120 weight percent of the aqueous carrier, each based on a weight of the cement component.

11. The method of claim 1, wherein the cement slurry has a density of about 7 to about 22 pounds per gallon.

* * * * *